(12) United States Patent
Kawaguchi et al.

(10) Patent No.: US 10,139,558 B2
(45) Date of Patent: Nov. 27, 2018

(54) OPTICAL FIBER

(71) Applicant: SUMITOMO ELECTRIC INDUSTRIES, LTD., Osaka-shi, Osaka (JP)

(72) Inventors: Yuki Kawaguchi, Yokohama (JP); Yoshinori Yamamoto, Yokohama (JP); Masaaki Hirano, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 58 days.

(21) Appl. No.: 15/363,154

(22) Filed: Nov. 29, 2016

(65) Prior Publication Data

US 2017/0075060 A1 Mar. 16, 2017

Related U.S. Application Data

(63) Continuation of application No. PCT/JP2015/065976, filed on Jun. 3, 2015.

(30) Foreign Application Priority Data

Jun. 5, 2014 (JP) .................................. 2014-116529

(51) Int. Cl.
*G02B 6/02* (2006.01)
*G02B 6/036* (2006.01)

(52) U.S. Cl.
CPC ......... *G02B 6/02019* (2013.01); *G02B 6/036* (2013.01); *G02B 6/03627* (2013.01); *G02B 6/03611* (2013.01); *G02B 6/03633* (2013.01)

(58) Field of Classification Search
None
See application file for complete search history.

(56) References Cited

U.S. PATENT DOCUMENTS 6,658,190 B2 * 12/2003 Hirano ............... G02B 6/02019
385/123
2013/0077925 A1 * 3/2013 Hirano ............... G02B 6/02019
385/123

FOREIGN PATENT DOCUMENTS

EP 2 362 252 A1 8/2011
EP 2 562 571 A2 2/2013
(Continued)

OTHER PUBLICATIONS

Yuki Kawaguchi et al., "Micro-Bending Loss Analysis of $A_{eff}$-Enlarged Fiber," Nen IEICE Communications Society Conference Koen Ronbunshu 2, Sep. 9, 2014, p. 178, [including English translation].
(Continued)

*Primary Examiner* — Chad H Smith
(74) *Attorney, Agent, or Firm* — Drinker Biddle & Reath LLP

(57) ABSTRACT

Provided is an optical fiber having W-shaped refractive-index distribution and in which a micro-bend loss in an actual usage waveband is reduced. The optical fiber includes a core, inner cladding that surrounds the core and has a refractive index smaller than a refractive index of the core, and outer cladding that surrounds the inner cladding and has a refractive index smaller than the refractive index of the core and larger than the refractive index of the inner cladding. When a coupling coefficient between a fundamental mode and a cladding mode is denoted by $C_{01\text{-}CL}$, a coupling coefficient between the fundamental mode and a higher-order mode is denoted by $C_{01\text{-}11}$, and a coupling coefficient between the higher-order mode and the cladding mode is denoted by $C_{11\text{-}CL}$, $C_{total}$ defined as $C_{total}=C_{01\text{-}CL}+C_{01\text{-}11}C_{11\text{-}CL}$ has a minimum value at a wavelength ranging between 1520 nm and 1630 nm.

5 Claims, 8 Drawing Sheets

(56) References Cited

FOREIGN PATENT DOCUMENTS

JP          S63-10113 A     1/1988
JP          2013-061620 A    4/2013
WO      WO-00/62106 A1   10/2000

OTHER PUBLICATIONS

Pierre Silliard et al., "Micro-bend losses of trench-assisted single-mode fibers," ECOC2010 We.8.F.3, IEEE Xplore, 2010, pp. 3.
Yuki Kawaguchi et al., "Aeff Enlarged Pure-Silica-Core Fiber Applicable for L-Band Transmission," IEICE Technical Report, Feb. 12, 2015, pp. 157-161, vol. 114, No. 453 [including English abstract].

\* cited by examiner

FIG. 5

| | Δ1 [%] | Δ2 [%] | 2a [μm] | b/a | Aeff [μm²] | λcc [μm] | λmin [μm] | λmin.fit [μm] | MICRO-BEND LOSS at 1550nm [dB/km] | BENDING LOSS at 1550nm (R=10mm) [dB/m] |
|---|---|---|---|---|---|---|---|---|---|---|
| EXAMPLE 1 | 0.31 | 0.05 | 11.8 | 5 | 113 | 1370 | 1542 | 1536 | 0.065 | 8.01 |
| EXAMPLE 2 | 0.4 | 0.16 | 12.3 | 3.5 | 110 | 1410 | 1569 | 1552 | 0.063 | 0.28 |
| EXAMPLE 3 | 0.35 | 0.09 | 12 | 4.5 | 112 | 1450 | 1585 | 1566 | 0.057 | 0.71 |
| EXAMPLE 4 | 0.3 | 0.1 | 12.6 | 5 | 125 | 1460 | 1591 | 1573 | 0.163 | 9.07 |
| EXAMPLE 5 | 0.28 | 0.01 | 12.7 | 3.5 | 131 | 1458 | 1594 | 1586 | 0.26 | 18.2 |
| EXAMPLE 6 | 0.28 | 0.05 | 13 | 3.5 | 134 | 1353 | 1524 | 1542 | 0.342 | 15.89 |
| EXAMPLE 7 | 0.38 | 0.13 | 12.7 | 3.8 | 115 | 1472 | 1603 | 1594 | 0.109 | 0.09 |
| EXAMPLE 8 | 0.3 | 0.09 | 14.2 | 3.5 | 145 | 1450 | 1581 | 1601 | 0.484 | 3.56 |
| EXAMPLE 9 | 0.32 | 0.08 | 13.2 | 3.5 | 130 | 1401 | 1550 | 1532 | 0.306 | 2.22 |
| EXAMPLE 10 | 0.3 | 0.1 | 13 | 4.2 | 131 | 1407 | 1564 | 1562 | 0.187 | 7.05 |
| EXAMPLE 11 | 0.34 | 0.09 | 13.5 | 3 | 131 | 1400 | 1561 | 1549 | 0.274 | 1.83 |
| EXAMPLE 12 | 0.27 | 0.09 | 13.8 | 3.9 | 146 | 1396 | 1557 | 1548 | 0.64 | 19.88 |
| EXAMPLE 13 | 0.44 | 0.19 | 13.2 | 3 | 115 | 1470 | 1600 | 1548 | 0.097 | 0.18 |
| EXAMPLE 14 | 0.27 | 0.13 | 14.2 | 4.2 | 150 | 1456 | 1591 | 1610 | 0.629 | 17.44 |
| EXAMPLE 15 | 0.26 | 0.13 | 15.2 | 3.3 | 166 | 1400 | 1570 | 1568 | 0.972 | 19.9 |
| EXAMPLE 16 | 0.34 | 0.16 | 15 | 3 | 150 | 1464 | 1588 | 1604 | 0.661 | 0.56 |
| EXAMPLE 17 | 0.27 | 0.03 | 13.9 | 2.8 | 147 | 1469 | 1601 | 1596 | 0.607 | 19.5 |
| EXAMPLE 18 | 0.28 | 0.08 | 14.3 | 3.4 | 151 | 1396 | 1547 | 1531 | 0.724 | 7.12 |
| EXAMPLE 19 | 0.3 | 0.1 | 15.7 | 2.5 | 165 | 1425 | 1582 | 1563 | 0.914 | 5.22 |
| EXAMPLE 20 | 0.29 | 0.1 | 14.4 | 3 | 150 | 1350 | 1530 | 1524 | 0.619 | 5.62 |
| EXAMPLE 21 | 0.27 | 0.07 | 15.4 | 3 | 171 | 1412 | 1545 | 1539 | 0.92 | 17.3 |
| EXAMPLE 22 | 0.26 | 0.06 | 15.6 | 3 | 175 | 1420 | 1572 | 1566 | 0.962 | 18.7 |

FIG. 7

| | Δ1 [%] | Δ2 [%] | Δ1' [%] | 2a [μm] | b/a | a/d [μm²] | Aeff [μm] | λcc [μm] | λmin [μm] | λmin fit [μm] | MICRO-BEND LOSS at 1550nm [dB/km] | BENDING LOSS at 1550nm (R=10mm) [dB/m] |
|---|---|---|---|---|---|---|---|---|---|---|---|---|
| EXAMPLE 23 | 0.34 | 0.05 | 0.1 | 11.8 | 5 | 3 | 113 | 1366 | 1540 | 1529 | 0.061 | 8.12 |
| EXAMPLE 24 | 0.41 | 0.16 | 0.02 | 12.3 | 3.5 | 2.5 | 110 | 1411 | 1569 | 1559 | 0.058 | 0.27 |
| EXAMPLE 25 | 0.4 | 0.09 | 0.14 | 12 | 4.5 | 2.8 | 112 | 1450 | 1585 | 1576 | 0.057 | 0.71 |
| EXAMPLE 26 | 0.35 | 0.1 | 0.18 | 12.6 | 5 | 3.5 | 125 | 1460 | 1588 | 1592 | 0.159 | 9.12 |
| EXAMPLE 27 | 0.3 | 0.01 | 0.04 | 12.7 | 3.5 | 2 | 131 | 1458 | 1592 | 1599 | 0.256 | 19.1 |
| EXAMPLE 28 | 0.32 | 0.05 | 0.16 | 13 | 3.5 | 4 | 134 | 1351 | 1520 | 1524 | 0.331 | 16.12 |
| EXAMPLE 29 | 0.42 | 0.13 | 0.1 | 12.7 | 3.8 | 2.8 | 115 | 1479 | 1601 | 1593 | 0.11 | 0.14 |
| EXAMPLE 30 | 0.35 | 0.09 | 0.11 | 14.2 | 3.5 | 2.2 | 145 | 1450 | 1580 | 1571 | 0.482 | 3.41 |
| EXAMPLE 31 | 0.36 | 0.08 | 0.14 | 13.2 | 3.5 | 3 | 130 | 1401 | 1550 | 1534 | 0.31 | 2.49 |
| EXAMPLE 32 | 0.33 | 0.1 | 0.12 | 13 | 4.2 | 3.2 | 131 | 1400 | 1560 | 1548 | 0.183 | 8.62 |
| EXAMPLE 33 | 0.37 | 0.09 | 0.1 | 13.5 | 3 | 3 | 131 | 1412 | 1563 | 1573 | 0.27 | 2.27 |
| EXAMPLE 34 | 0.3 | 0.09 | 0.09 | 13.8 | 3.9 | 2.6 | 146 | 1396 | 1557 | 1552 | 0.641 | 19.98 |
| EXAMPLE 35 | 0.45 | 0.19 | 0.02 | 13.2 | 3 | 4 | 115 | 1476 | 1604 | 1615 | 0.103 | 0.22 |
| EXAMPLE 36 | 0.32 | 0.13 | 0.14 | 14.2 | 4.2 | 3 | 150 | 1448 | 1583 | 1591 | 0.634 | 17.12 |
| EXAMPLE 37 | 0.3 | 0.13 | 0.09 | 15.2 | 3.3 | 2.4 | 166 | 1400 | 1570 | 1558 | 0.95 | 19.7 |
| EXAMPLE 38 | 0.36 | 0.16 | 0.07 | 15 | 3 | 3 | 150 | 1464 | 1588 | 1578 | 0.661 | 0.54 |
| EXAMPLE 39 | 0.33 | 0.03 | 0.16 | 13.9 | 2.8 | 3 | 147 | 1465 | 1596 | 1601 | 0.612 | 19.8 |
| EXAMPLE 40 | 0.32 | 0.08 | 0.12 | 14.3 | 3.4 | 3 | 151 | 1401 | 1550 | 1534 | 0.721 | 7.04 |
| EXAMPLE 41 | 0.32 | 0.1 | 0.07 | 15.7 | 2.5 | 2.8 | 165 | 1428 | 1583 | 1600 | 0.907 | 5.04 |
| EXAMPLE 42 | 0.33 | 0.1 | 0.12 | 14.4 | 3 | 2.8 | 150 | 1345 | 1523 | 1524 | 0.612 | 5.54 |
| EXAMPLE 43 | 0.3 | 0.07 | 0.1 | 15.4 | 3 | 3 | 171 | 1420 | 1534 | 1544 | 0.925 | 17.8 |
| EXAMPLE 44 | 0.28 | 0.08 | 0.05 | 15.5 | 3 | 3 | 175 | 1423 | 1563 | 1571 | 0.982 | 18.3 |

OPTICAL FIBER

CROSS-REFERENCE TO RELATED APPLICATIONS

The present application is a continuation application of International Application No. PCT/JP2015/065976, filed Jun. 3, 2015, which claims priority to Japanese Patent Application No. 2014-116529, filed Jun. 5, 2014. The contents of these applications are incorporated herein by reference in their entirety.

BACKGROUND OF THE INVENTION

Field of the Invention

The present invention relates to optical fibers.

Technical Background

In optical communication systems, optical-fiber transmission paths are used as optical transmission paths that transmit signal light. In signal light transmission (i.e., digital coherent transmission in particular), it is desirable that the OSNR (optical signal-to-noise ratio) be improved. In order to achieve this, it is required to reduce attenuation and nonlinearity of an optical fiber. In order to reduce nonlinearity of an optical fiber, it is effective to increase the effective area of the optical fiber. For example, an optical fiber with an effective area increased to 110 µm² or larger is known. However, in an optical fiber with an increased effective area, the confinement of propagation light (fundamental-mode light) to a core weakens and a micro-bend loss tends to increase, ultimately causing the OSNR to become lower. A micro-bend loss is a phenomenon in which a transmission loss increases due to a leakage of light caused when a fundamental mode propagating through the core is coupled with a cladding mode due to random micro-bending occurring as a result of stress applied to the optical fiber from a side.

Pierre Sillard, et al., "Micro-Bend Losses of Trench-Assisted Single-Mode Fibers," ECOC2010 We.8.F.3 (Non-Patent Literature 1) describes a micro-bend loss. According to Non Patent Literature 1, in a single-mode optical fiber having step-shaped refractive-index distribution, the micro-bend loss increases exponentially relative to the wavelength. In an optical fiber having trench-shaped refractive-index distribution, random micro-bending causes the fundamental mode to be coupled with a higher-order mode, which is a leakage mode, so that the micro-bend loss is relatively uniform with respect to the wavelength. Trench-shaped refractive-index distribution has a core, first cladding, second cladding, and third cladding in that order from the center. The refractive index of the core is larger than the refractive indices of the first cladding and the third cladding, and the refractive index of the second cladding is smaller than the refractive indices of the first cladding and the third cladding.

W-shaped refractive-index distribution is known as refractive-index distribution of an optical fiber in which the effective area thereof can be increased. W-shaped refractive-index distribution has a core, inner cladding that surrounds the core and has a refractive index smaller than the refractive index of the core, and outer cladding that surrounds the inner cladding and has a refractive index smaller than the refractive index of the core and larger than the refractive index of the inner cladding. The wavelength dependency (spectrum) of the micro-bend loss of an optical fiber having W-shaped refractive-index distribution is not described in Non Patent Literature 1.

SUMMARY OF THE INVENTION

An object of the present invention is to provide an optical fiber that is used as an optical transmission path so that optical communication can be performed with an excellent OSNR.

An optical fiber according to the present invention includes a core, inner cladding that surrounds the core and has a refractive index smaller than a refractive index of the core, and outer cladding that surrounds the inner cladding and has a refractive index smaller than the refractive index of the core and larger than the refractive index of the inner cladding. A quadratic function approximating a spectrum of a loss increase caused by micro-bending at a wavelength ranging between 1400 nm and 1700 nm has a minimum value at a wavelength ranging between 1520 nm and 1630 nm. Alternatively, the optical fiber according to the present invention has a coupling coefficient $C_{01\text{-}CL}$ between a fundamental mode and a cladding mode, a coupling coefficient $C_{01\text{-}11}$ between the fundamental mode and a higher-order mode, and a coupling coefficient $C_{11\text{-}CL}$ between the higher-order mode and the cladding mode, and $C_{total}$ defines as $C_{total}=C_{01\text{-}CL}+C_{01\text{-}11}C_{11\text{-}CL}$ has a minimum value at a wavelength ranging between 1520 nm and 1630 nm. In this description, a loss increase caused by micro-bending refers to a loss increase occurring when an optical fiber is wound, with a tensile force of 80 g, around a bobbin with a diameter of 400 mm and whose surface is covered with wire mesh, which is obtained by weaving wires having a diameter of 50 µm at a pitch of 100 µm.

The optical fiber according to the present invention may have a cable cutoff wavelength defined based on ITU-T G650.1 and ranging between 1350 nm and 1475 nm inclusive. The optical fiber according to the present invention may have an effective area ranging between 110 µm² and 175 µm² inclusive at a wavelength of 1550 nm. Furthermore, the effective area at the wavelength of 1550 nm may range between 110 µm² and 165 µm² inclusive or may range between 130 µm² and 165 µm² inclusive. The core may have a diameter ranging between 11.5 µm and 16.0 µm inclusive, a relative refractive-index difference of the core relative to the inner cladding may range between 0.25% and 0.45% inclusive, a ratio of an outer diameter of the inner cladding to the diameter of the core may range between 2.5 and 5.0 inclusive, and a relative refractive-index difference of the outer cladding relative to the inner cladding may range between 0.01% and 0.20% inclusive.

The optical fiber may include a ring-shaped outer peripheral core section and a depressed section at a center of the core and having a refractive index smaller than a refractive index of the outer peripheral core section. In this case, a ratio of an outer diameter of the core to a diameter of the depressed section may range between 2.0 and 4.0 inclusive, and a relative refractive-index difference of the depressed section relative to the core may range between 0.02% and 0.20% inclusive.

An optical-fiber transmission path according to the present invention has the optical fiber according to the present invention. The optical fiber according to the present invention transmits signal light with a wavelength ranging between 1520 nm and 1630 nm.

By using the optical fiber according to the present invention as an optical transmission path, optical communication can be performed with an excellent OSNR.

BRIEF DESCRIPTION OF THE DRAWINGS

FIG. 5 is a table illustrating the specifications and properties of optical fibers according to Examples 1 to 22.

FIG. 7 is a table illustrating the specifications and properties of optical fibers according to Examples 23 to 44.

DETAILED DESCRIPTION OF THE PREFERRED EMBODIMENTS

An embodiment of the present invention will be described in detail below with reference to the appended drawings. The present invention is not to be limited to the following examples and is intended to include all modifications that are indicated by the scope of the claims and that have meanings equivalent to and within the scope of the claims.

Figure 1:
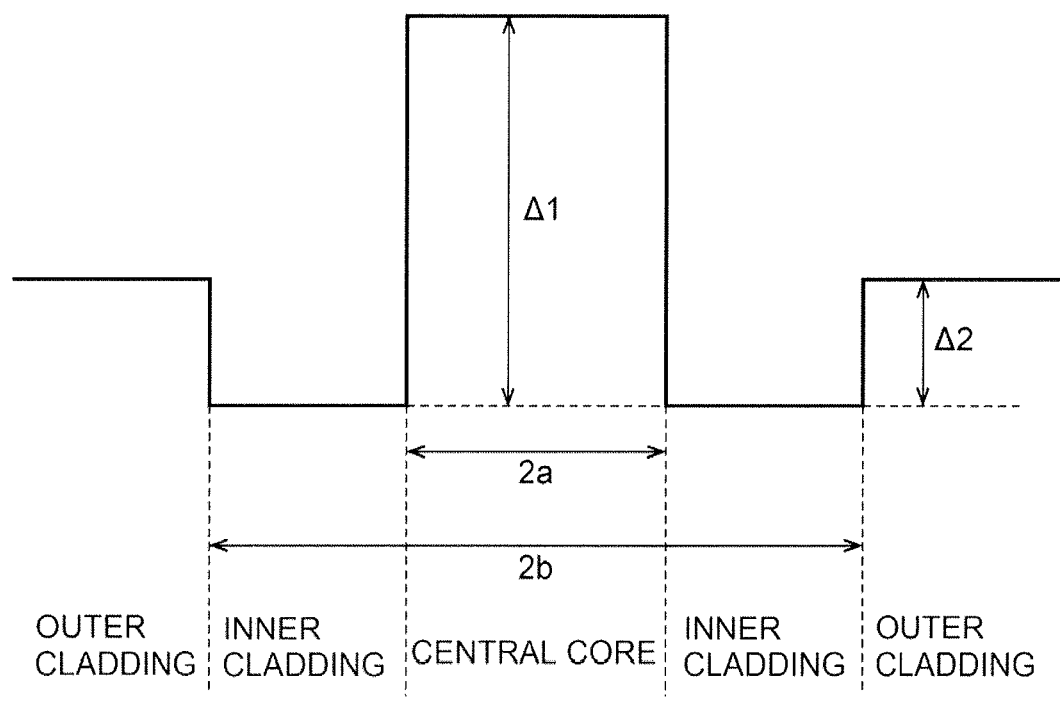
FIG. 1 schematically illustrates refractive-index distribution of an optical fiber according to an embodiment of the present invention.

FIG. 1 schematically illustrates refractive-index distribution of an optical fiber according to an embodiment of the present invention. The optical fiber according to this embodiment has a core, inner cladding surrounding the core, and outer cladding surrounding the inner cladding. The refractive index of the inner cladding is smaller than the refractive index of the core. The refractive index of the outer cladding is smaller than the refractive index of the core and is larger than the refractive index of the inner cladding. The diameter of the core is denoted by 2$a$, and the outer diameter of the inner cladding is denoted by 2$b$. With reference to the refractive index of the inner cladding, a relative refractive-index difference of the core is denoted by $\Delta 1$=((refractive index of core)−(refractive index of inner cladding))/(refractive index of inner cladding), and a relative refractive-index difference of the outer cladding is denoted by $\Delta 2$=((refractive index of outer cladding)−(refractive index of inner cladding))/(refractive index of inner cladding).

In this optical fiber, a fundamental mode (LP01 mode) is sometimes coupled with a higher-order mode (LP11 mode in particular) and is sometimes coupled with a cladding mode. Furthermore, after the fundamental mode is coupled with the higher-order mode, this higher-order mode is sometimes further coupled with the cladding mode. Since the coupling of the fundamental mode to a higher-order mode other than the LP11 mode is sufficiently small, only the LP11 mode may be taken into account as a higher-order mode.

A micro-bend loss of an optical fiber is caused due to optical coupling between modes caused by random micro-bending of the optical fiber. A coupling coefficient $C_{1-2}$ between a certain first mode and another second mode is expressed by Expression (1).

$$C_{1-2}(\beta) = \frac{K}{\lambda^2 |\beta_1 - \beta_2|^{2p}} \int\int r\cos(\theta)\psi_1\psi_2 r\,dr\,d\theta \tag{1}$$

In this case, each of the first mode and the second mode is any one of the fundamental mode (LP01 mode), the higher-order mode (LP11 mode), and the cladding mode. In the expression, $\lambda$ denotes a wavelength, $\beta_1$ denotes a propagation constant of the first mode, $\Psi_1$ denotes power distribution of the first mode, $\beta_2$ denotes a propagation constant of the second mode, $\Psi_2$ denotes power distribution of the second mode, $r$ denotes a variable expressing the distance from the central axis of the optical fiber in the radial direction, $\theta$ denotes a variable expressing the position around the central axis of the optical fiber, and K and p denote fitting parameters. For example, K=2.8 and p=2.8.

A coupling coefficient between the fundamental mode (LP01 mode) and the cladding mode is denoted by $C_{01-CL}$, a coupling coefficient between the fundamental mode (LP01 mode) and the higher-order mode (LP11 mode) is denoted by $C_{01-11}$, and a coupling coefficient between the higher-order mode (LP11 mode) and the cladding mode is denoted by $C_{11-CL}$. The coupling coefficients $C_{01-CL}$, $C_{01-11}$, and $C_{11-CL}$ are expressed by Expression (1) and are wavelength functions. Due to random micro-bending of the optical fiber, the fundamental mode propagating through the optical fiber sometimes leaks by directly becoming cladding mode and also leaks by becoming the cladding mode via the higher-order mode. Therefore, a coupling coefficient $C_{total}$ between the fundamental mode and the cladding mode in view of a case where the fundamental mode is directly or indirectly coupled with the cladding mode is defined as Expression (2).

$$C_{total} = C_{01-CL} + C_{01-11}C_{11-CL} \tag{2}$$

Figure 2:
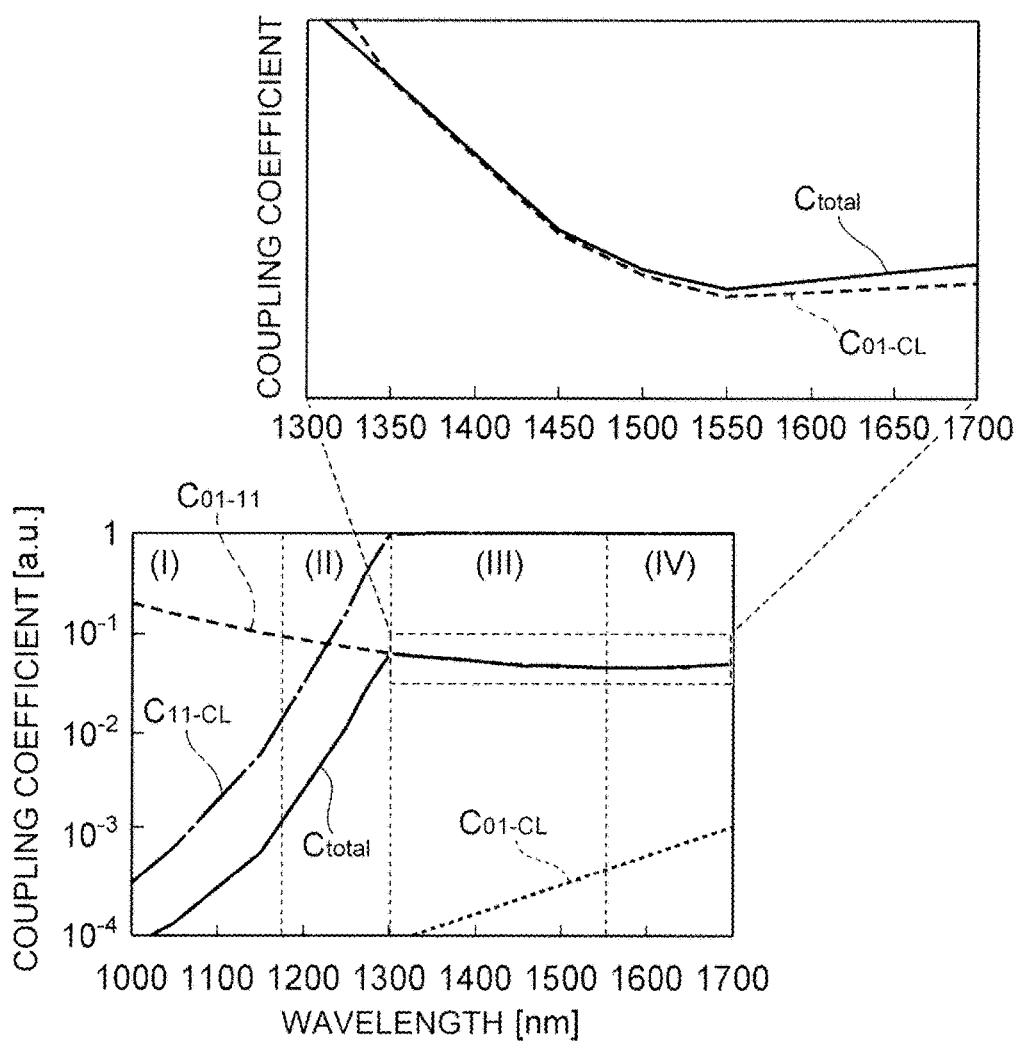
FIG. 2 is a graph illustrating an example of wavelength dependency of each of coupling coefficients $C_{01-CL}$, $C_{01-11}$, $C_{11-CL}$, and $C_{total}$.

FIG. 2 is a graph illustrating an example of wavelength dependency of each of the coupling coefficients $C_{01-CL}$, $C_{01-11}$, $C_{11-CL}$, and $C_{total}$. In FIG. 2, a wavelength range between 1000 nm and 1700 nm is divided into four wavelength regions (I) to (IV).

In the wavelength region (I) (i.e., in a region lower than or equal to approximately 1170 nm in FIG. 2), the coupling coefficient $C_{01-CL}$ is small enough to be negligible and the coupling coefficient $C_{11-CL}$ is also small. Thus, the micro-bend loss is extremely small. In the wavelength region (II) (i.e., in a region approximately between 1170 nm and 1300 nm inclusive in FIG. 2), the coupling coefficient $C_{11-CL}$ rapidly becomes larger so that the micro-bend loss increases rapidly. In the wavelength region (III) (i.e., in a region approximately between 1300 nm and 1550 nm inclusive in FIG. 2), the effective refractive index of the higher-order mode becomes lower than the refractive index of the outer cladding, and the higher-order mode entirely becomes the cladding mode and results in a leakage. However, since the coupling coefficient $C_{01-11}$ becomes smaller, the micro-bend loss decreases. In the wavelength region (IV) (i.e., in a region higher than or equal to approximately 1550 nm in FIG. 2), the coupling coefficient $C_{01-CL}$ becomes larger so that the micro-bend loss increases. Therefore, the coupling coefficient $C_{total}$ has a minimum value at the boundary between the wavelength region (III) and the wavelength region (IV).

Figure 3:
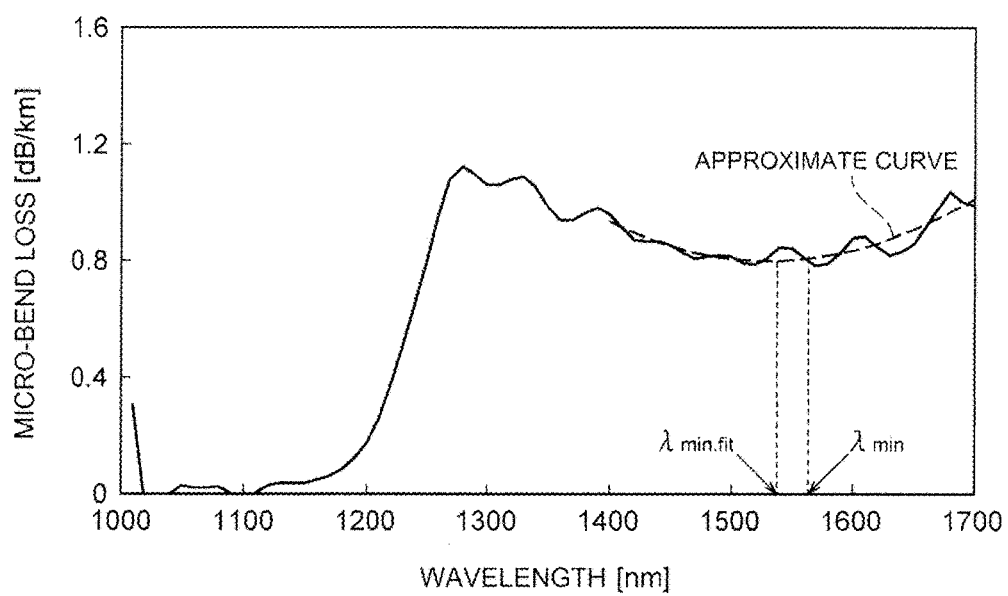
FIG. 3 is a graph illustrating an example of wavelength dependency with respect to a micro-bend loss of the optical fiber.

FIG. 3 is a graph illustrating an example of wavelength dependency with respect to the micro-bend loss of the optical fiber. The wavelength dependency of the micro-bend loss has a tendency similar to the wavelength dependency of the coupling coefficient $C_{total}$ shown in FIG. 2. The micro-bend loss becomes a minimum at a wavelength at which the coupling coefficient $C_{total}$ becomes a minimum. The wavelength at which the micro-bend loss becomes a minimum is denoted by $\lambda_{min}$. In the wavelength dependency of the micro-bend loss shown in FIG. 3, a wavelength at which a quadratic function approximating a spectrum of a loss increase caused by micro-bending at a wavelength ranging between 1400 nm and 1700 nm has a minimum value is denoted by $\lambda_{min.fit}$. The difference between $\lambda_{min}$ (=1560 nm) and $\lambda_{min.fit}$ (=1540 nm) is small at 20 nm, and $\lambda_{min}$ and $\lambda_{min.fit}$ can be considered to be substantially equal to each other.

The micro-bend loss is measured in the following manner. A bobbin with a diameter of 400 mm and whose surface is covered with wire mesh, which is obtained by weaving wires having a diameter of 50 μm at a pitch of 100 μm, is prepared. The micro-bend loss is measured as a loss increase when an optical fiber is wound around this bobbin with a tensile force of 80 g. The micro-bend loss measured in accordance with this measurement method is desirably 1.0 dB/km or smaller.

Accordingly, the wavelength dependency of the micro-bend loss is dependent on the coupling among the fundamental mode, the higher-order mode, and the cladding mode. Since the wavelength at which the leakage loss of the higher-order mode increases and the higher mode can no longer be propagated is a cable cutoff wavelength, the wavelengths $\lambda_{min.fit}$ and $\lambda_{min}$ can be set within the actual usage waveband by properly designing the cable cutoff wavelength, so that the micro-bend loss can be reduced. Specifically, the optical fiber according to this embodiment has a structure in which the micro-bend loss becomes a minimum value in the actual usage waveband. The actual usage waveband is a waveband normally used in optical communication and is, for example, a C band (1530 nm to 1565 nm) or an L band (1565 nm to 1625 nm).

Figure 4:
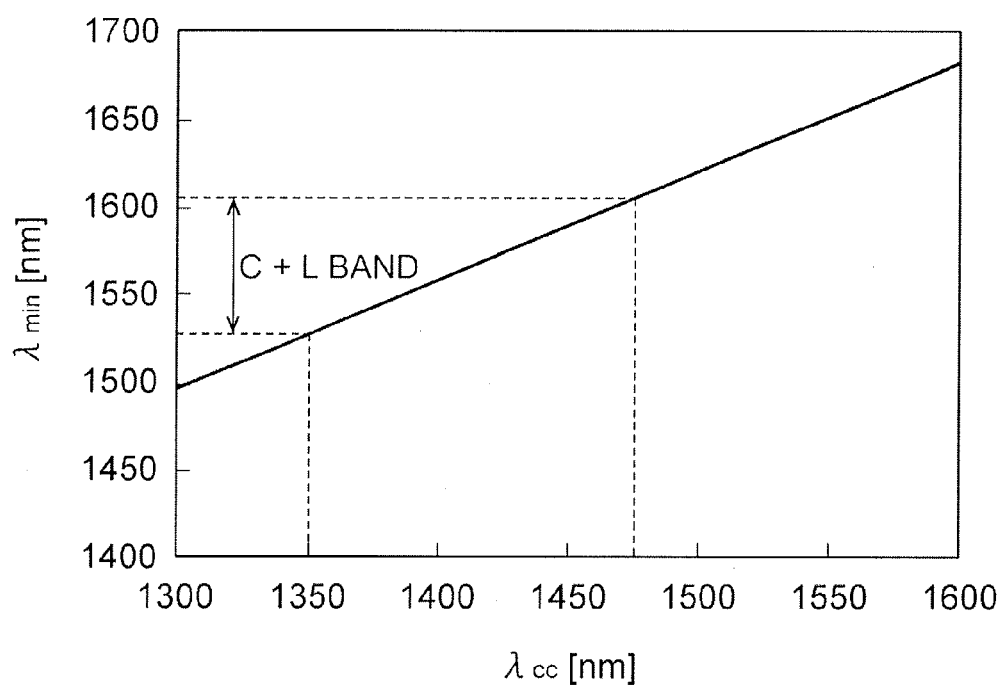
FIG. 4 is a graph illustrating the relationship between a wavelength $\lambda_{min}$ and a cable cutoff wavelength $\lambda_{CC}$.

FIG. 4 is a graph illustrating the relationship between the wavelength $\lambda_{min}$ and the cable cutoff wavelength $\lambda_{CC}$. In order to set the wavelength $\lambda_{min}$ within the actual usage waveband, it is preferable that the cable cutoff wavelength $\lambda_{CC}$ be within a range between 1350 nm and 1475 nm.

FIG. 5 is a table illustrating the specifications and properties of optical fibers according to Examples 1 to 22. The optical fiber according to each of Examples 1 to 22 has the refractive-index distribution shown in FIG. 1. In this table, the relative refractive-index difference Δ1 of the core relative to the inner cladding, the relative refractive-index difference Δ2 of the outer cladding relative to the inner cladding, the diameter 2a of the core, the ratio b/a of the outer diameter of the inner cladding to the diameter of the core, the effective area $A_{eff}$ at the wavelength of 1550 nm, the cable cutoff wavelength $\lambda_{CC}$, the wavelengths $\lambda_{min.fit}$ and $\lambda_{min}$ at which the micro-bend loss becomes a minimum value, the micro-bend loss at the wavelength of 1550 nm, and the bending loss at the wavelength of 1550 nm when the bending radius R is set to 10 mm are listed in the above order. The bending loss when R=10 mm is preferably 20 dB/m or smaller. The difference between $\lambda_{min}$, which is calculated from numerical values, and $\lambda_{min.fit}$, which is determined from measurement, is ±20 nm or smaller and are substantially equal to each other. Therefore, from a practical standpoint, $\lambda_{min.fit}$ may be within the usage waveband.

The effective area $A_{eff}$ at the wavelength of 1550 nm preferably ranges between 110 μm² and 175 μm² inclusive, more preferably ranges between 110 μm² and 165 μm² inclusive, and even more preferably ranges between 130 μm² and 165 μm² inclusive. Furthermore, the diameter 2a of the core preferably ranges between 11.5 μm and 16.0 μm inclusive, the relative refractive-index difference Δ1 of the core preferably ranges between 0.25% and 0.45% inclusive, the ratio b/a of the outer diameter of the inner cladding to the diameter of the core preferably ranges between 2.5 and 5.0 inclusive, and the relative refractive-index difference Δ2 of the outer cladding preferably ranges between 0.01% and 0.20% inclusive.

Figure 6:
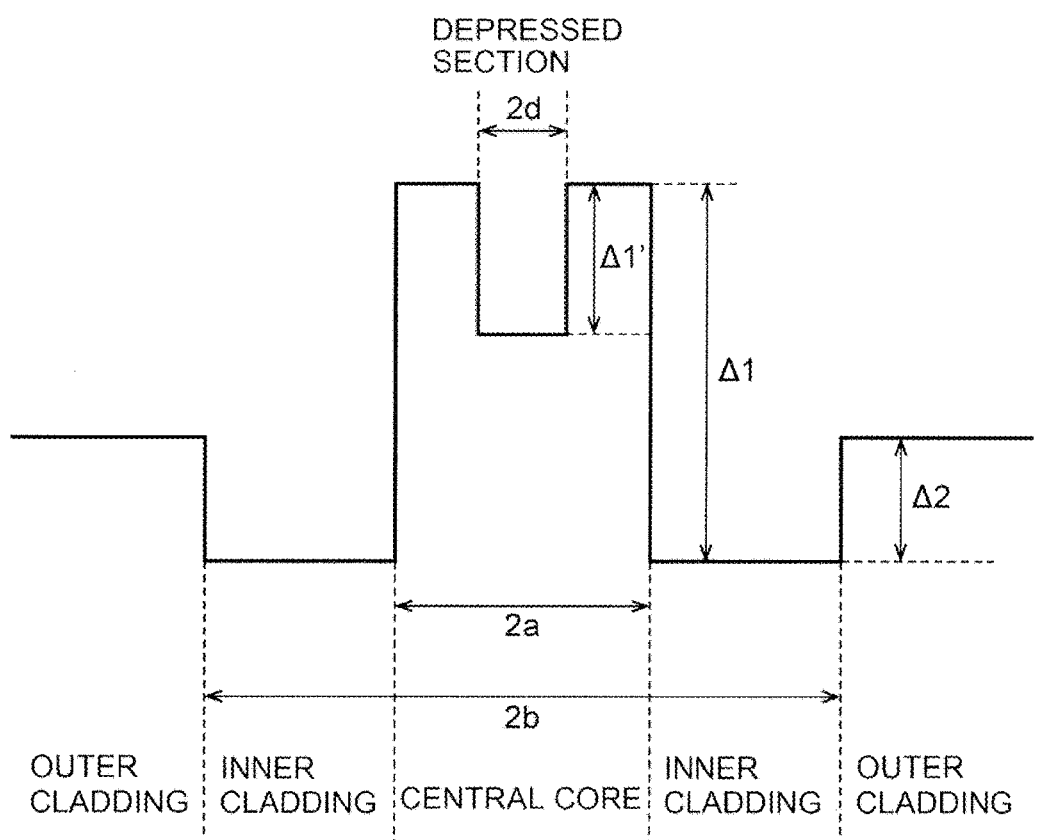
FIG. 6 schematically illustrates refractive-index distribution of an optical fiber according to a modification of the embodiment.

FIG. 6 illustrates refractive-index distribution of an optical fiber according to a modification. As compared with the refractive-index distribution shown in FIG. 1, the optical fiber shown in FIG. 6 differs therefrom in having a depressed section at the center of the core. The refractive index of the depressed section is smaller than the refractive index of a ring-shaped outer peripheral core section. The diameter of the depressed section is denoted by 2d, and the relative refractive-index difference of the depressed section is denoted by Δ1' with reference to the refractive index of the outer peripheral core section. Even in this optical fiber having such refractive-index distribution, the micro-bend loss can have a minimum value at the wavelength ranging between 1520 nm and 1630 nm. Moreover, in the optical fiber having such refractive-index distribution, a mode field diameter MFD can be relatively reduced while increasing the effective area $A_{eff}$, thereby reducing a connection loss with another optical fiber (e.g., an optical fiber compliant with ITU-T G652).

FIG. 7 is a table illustrating the specifications and properties of optical fibers according to Examples 23 to 44. The optical fiber according to each of Examples 23 to 44 has the refractive-index distribution shown in FIG. 6. In this table, the relative refractive-index difference Δ1 of the outer peripheral core section relative to the inner cladding, the relative refractive-index difference Δ2 of the outer cladding relative to the inner cladding, the relative refractive-index difference Δ1' of the depressed section relative to the outer peripheral core section, the diameter 2a of the core, the ratio b/a of the outer diameter of the inner cladding to the outer diameter of the core, the ratio a/d of the outer diameter of the core to the diameter of the depressed section, the effective area $A_{eff}$ at the wavelength of 1550 nm, the cable cutoff wavelength $\lambda_{CC}$, the wavelengths $\lambda_{min.fit}$ and $\lambda_{min}$ at which the micro-bend loss becomes a minimum value, the micro-bend loss at the wavelength of 1550 nm, and the bending loss at the wavelength of 1550 nm when the bending radius R is set to 10 mm are listed in the above order. The ratio a/d of the outer diameter of the core to the diameter of the depressed section preferably ranges between 2.0 and 4.0 inclusive, and the relative refractive-index difference Δ1' of the depressed section preferably ranges between 0.02% and 0.20% inclusive.

Figure 8:
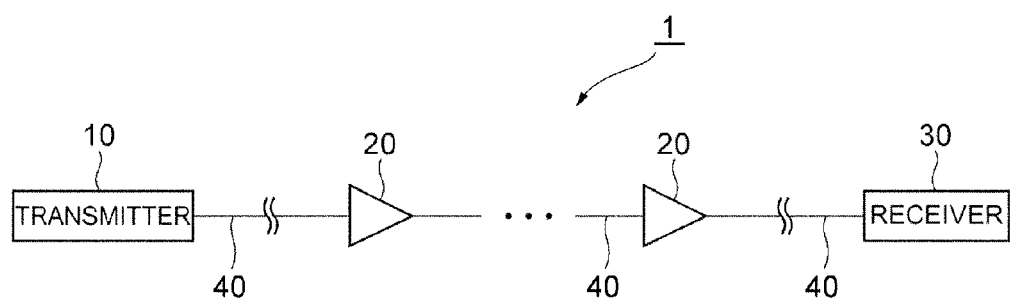
FIG. 8 schematically illustrates an optical communication system having the optical fiber according to the present invention as an optical transmission path.

FIG. 8 schematically illustrates an optical communication system 1 having the optical fiber according to the present invention as an optical transmission path. The optical communication system 1 transmits signal light from a transmitter 10 to a receiver 30 via repeaters 20. An optical fiber 40 according to the present invention is provided as an optical transmission path that transmits signal light between the transmitter 10 and the repeater 20 at the first stage, between one repeater 20 and the repeater 20 at the subsequent stage, and between the repeater 20 at the final stage and the receiver 30.

The optical fiber according to the present invention used as an optical transmission path has the refractive-index distribution shown in FIG. 1 or FIG. 6, in which the micro-bend loss has a minimum value at a wavelength ranging between 1520 nm and 1630 nm and in which the micro-bend loss in the actual usage waveband is reduced. In a fiber having increased Aeff for reducing nonlinearity, the micro-bend loss tends to increase. Therefore, the transmission properties of the optical fiber according to the present invention are effective, and the optical communication system 1 can perform optical communication with an excellent OSNR.

INDUSTRIAL APPLICABILITY

The present invention is effective in an optical transmission system that performs digital coherent transmission.

What is claimed is:

1. An optical fiber comprising:
   a core;
   an inner cladding that surrounds the core and has a refractive index smaller than a refractive index of the core; and
   an outer cladding that surrounds the inner cladding and has a refractive index smaller than the refractive index of the core and larger than the refractive index of the inner cladding,
   wherein the core has a diameter ranging between 11.5 μm and 16.0 μm inclusive,
   a relative refractive-index difference of the core relative to the inner cladding ranges between 0.25% and 0.45% inclusive,
   a ratio of an outer diameter of the inner cladding to the diameter of the core ranges between 2.5 and 5.0 inclusive,
   a relative refractive-index difference of the outer cladding relative to the inner cladding ranges between 0.01% and 0.20% inclusive, and
   the core includes a ring-shaped outer peripheral core section and a depressed section at a center of the core and having a refractive index smaller than a refractive index of the outer peripheral core section, and
   wherein a quadratic function approximating a spectrum of a loss increase caused by micro-bending at a wavelength ranging between 1400 nm and 1700 nm has a minimum value at a wavelength ranging between 1520 nm and 1630 nm, and
   the optical fiber has an effective area ranging between 150 μm$^2$ and 175 μm$^2$ inclusive at a wavelength of 1550 nm.

2. The optical fiber according to claim 1,
   wherein the optical fiber has a coupling coefficient $C_{01\text{-}CL}$ between a fundamental mode and a cladding mode, a coupling coefficient $C_{01\text{-}11}$ between the fundamental mode and a higher-order mode, and a coupling coefficient $C_{11\text{-}CL}$ between the higher-order mode and the cladding mode, and wherein $C_{total}$ defined as $C_{total}=C_{01\text{-}CL}+C_{01\text{-}11}C_{11\text{-}CL}$ has a minimum value at a wavelength ranging between 1520 nm and 1630 nm.

3. The optical fiber according to claim 1,
   wherein a ratio of an outer diameter of the core to a diameter of the depressed section ranges between 2.0 and 4.0 inclusive, and
   wherein a relative refractive-index difference of the depressed section relative to the core ranges between 0.02% and 0.20% inclusive.

4. An optical-fiber transmission path comprising:
   the optical fiber according to claim 1,
   wherein the optical fiber transmits signal light with a wavelength ranging between 1520 nm and 1630 nm.

5. The optical fiber according to claim 1,
   wherein the optical fiber has a cable cutoff wavelength ranging between 1350 nm and 1475 nm inclusive.

* * * * *